United States Patent
Hugosson et al.

(10) Patent No.: US 7,072,529 B2
(45) Date of Patent: Jul. 4, 2006

(54) SYSTEMS AND METHODS FOR INFORMATION STORAGE

(75) Inventors: Ola Hugosson, Lund (SE); Petter Ericson, Malmö (SE)

(73) Assignee: Anoto AB, Lund (SE)

( * ) Notice: Subject to any disclaimer, the term of this patent is extended or adjusted under 35 U.S.C. 154(b) by 885 days.

(21) Appl. No.: 09/812,885

(22) Filed: Mar. 21, 2001

(65) Prior Publication Data

US 2001/0038349 A1 Nov. 8, 2001

Related U.S. Application Data

(60) Provisional application No. 60/207,839, filed on May 30, 2000.

(30) Foreign Application Priority Data

Mar. 21, 2000 (SE) .............................. 0000947

(51) Int. Cl.
G06K 9/54 (2006.01)
H03M 7/34 (2006.01)

(52) U.S. Cl. ............................ 382/305; 341/51; 341/87; 235/460

(58) Field of Classification Search ................. 382/165, 382/170, 181, 183, 232–233, 305, 312, 197; 235/435, 446, 460, 462.01, 462.09, 460.01, 235/460.09; 178/17.5, 18.01, 17 R, 19.05; 345/179, 180; 341/87, 51

See application file for complete search history.

(56) References Cited

U.S. PATENT DOCUMENTS

| | | | | |
|---|---|---|---|---|
| 5,303,312 A | * | 4/1994 | Comerford et al. | 382/189 |
| 5,329,107 A | * | 7/1994 | Priddy et al. | 235/494 |
| 5,343,031 A | * | 8/1994 | Yoshida | 235/494 |
| 5,434,371 A | * | 7/1995 | Brooks | 178/19.04 |
| 5,652,412 A | * | 7/1997 | Lazzouni et al. | 178/18.01 |
| 5,852,434 A | * | 12/1998 | Sekendur | 345/179 |
| 5,912,869 A | * | 6/1999 | Tanaka et al. | 369/59.23 |
| 6,047,892 A | * | 4/2000 | Schuessler et al. | 235/462.09 |
| 6,516,037 B1 | * | 2/2003 | Wei | 375/264 |

FOREIGN PATENT DOCUMENTS

| | | |
|---|---|---|
| WO | WO9217859 | 10/1992 |
| WO | WO0073983 | 12/2000 |
| WO | WO0116691 | 3/2001 |
| WO | WO0126032 | 4/2001 |

OTHER PUBLICATIONS

"Pseudo–Random Sequences and Arrays" by F. Jessie MacWilliams and Neil J.A. Sloane in "Proceedings of the IEEE," vol. 64, No. 12, Dec. 1976.

* cited by examiner

Primary Examiner—Kanjibhai Patel
(74) Attorney, Agent, or Firm—Birch, Stewart, Kolasch & Brich, LLP (57) ABSTRACT

A product with stored non-sequential data may be provided using a method that codes the data to a coding pattern using at least one sequence with symbols. The coding pattern may be configured such that an arbitrary subsequence of a predetermined magnitude of the sequence unambiguously defines the position of the subsequence in the sequence. The coding pattern may be reproduced on a product. An apparatus may be adapted to record and decode the coding pattern.

36 Claims, 6 Drawing Sheets

SYSTEMS AND METHODS FOR INFORMATION STORAGE

CROSS REFERENCE TO RELATED APPLICATIONS

This application claims priority benefits based on Swedish Patent Application No. 0000947-2, Filed Mar. 21, 2000, and U.S. Provisional Application 60/207,839, filed May 30, 2000, the technical disclosures of both of which are hereby incorporated herein by reference.

FIELD OF THE INVENTION

The present invention relates to a method for storage of information or data and a device adapted to read data stored by means of the method.

BACKGROUND OF THE INVENTION

There are a plurality of known methods for storage of data. The traditional technique of storing written information is to store text in printed products such as books and newspapers. There are, however, several drawbacks of storing text in book form. One of the drawbacks is that books require much space. To achieve storage requiring less space, documents have for a long time been stored on microfiche. For a high degree of compaction, however, it is necessary to use photographic films for such storage since ordinary paper has a strictly limited packing density. The storage alternatives to books which are advancing most rapidly are those based on the use of computers. A plurality of storage media for digital information are available. Examples of such storage media are RAM, magnetic media and optical media, such as optical discs. Another technique of storing information that can be read optically is bar codes which are used to a great extent in the retailing of everyday commodities when prices are included.

It is in some cases desirable to distribute text stored in a compact fashion. With computers, a user may need to be electronically connected with the distributor of the stored information. Alternatively, microfiche or magnetic or optical data storage media may not be as widely available.

SUMMARY OF A FEW ASPECTS OF THE INVENTION

In one aspect, a method for the storage of non-sequential data consistent with the invention includes coding the data to a coding pattern, the coding pattern comprising at least one sequence with symbols which have the characteristic that an arbitrary subsequence of a predetermined magnitude of the sequence unambiguously defines the position of the subsequence in the sequence, and reproducing the coding pattern on a product.

In another aspect, a system for the storage of non-sequential data consistent with the invention includes a component for coding the data to a coding pattern, the coding pattern comprising at least one sequence with symbols which have the characteristic that an arbitrary subsequence of a predetermined magnitude of the sequence unambiguously defines the position of the subsequence, in the sequence, and a component for reproducing the coding pattern on a product.

In yet another aspect, an apparatus for optically recording information consistent with the invention includes an image sensor adapted to optically record an image from a surface, and a processor configured to convert the image into data, the image comprising a predetermined number of subsequences with symbols, each of the subsequences unambiguously corresponding to a position in a predetermined sequence which is arranged in such manner that an arbitrary subsequence of a predetermined magnitude unambiguously defines a position in the sequence.

The foregoing summarizes only a few aspects of the invention and is not intended to be reflective of the full scope of the invention as claimed. Additional features and advantages of the invention are set forth in the following description, apparent from the description, or may be learned by practicing the invention. Moreover, both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF PREFERRED EMBODIMENTS

Reference will now be made to various embodiments according to this invention, examples of which are shown in the accompanying drawings and will be obvious from the description of the invention. In the drawings, the same reference numbers represent the same or similar elements in the different drawings whenever possible.

Broadly stated, the invention may include a method and system for the storage of non-sequential data by means of a matrix of symbols which can be recorded optically and a device adapted to read the data stored by the method.

A method for storage of non-sequential data according to the invention may be characterized in that it comprises the steps of coding the data to a coding pattern by at least one sequence with symbols which have the characteristic that an arbitrary subsequence of a predetermined magnitude of the sequence unambiguously defines the position of the subsequence in the sequence, and reproducing the coding pattern on a product.

In this context, the term "product" relates to all possible articles on which a coding pattern can be applied. In the first place, sheets of paper in newspapers, books as well as loose sheets of paper are intended, but also other articles, such as bulletin boards, can be provided with a coding pattern. The product can be an arbitrary product on which one wants to have coded information. By coding the information by means of a sequence of the above type, a code is made possible, which may be relatively insensitive to how it is read by an apparatus. At the same time, compact storage of the information may be permitted. As mentioned above, the product may consist of any product. Data relates to information such as text or other information. Data also relates to, for example, a command to a computer. This type of information is usually non-periodic.

The term non-sequential defines that the data is arbitrary in the sense that it is not a sequence of numbers in one or more dimensions. Such a sequence may easily be stored as a mathematical expression.

Figure 1:
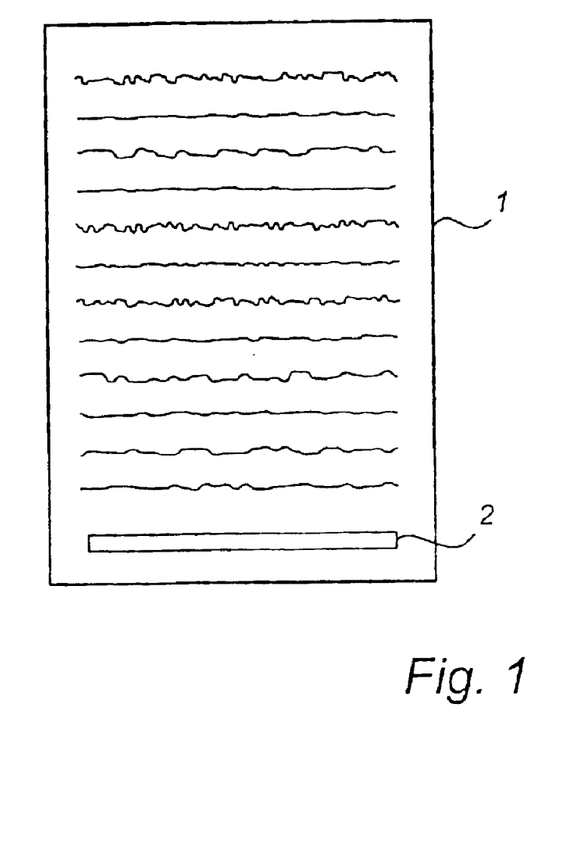
FIG. 1 shows a document in the form of a page in a book with a coding pattern according to a preferred embodiment of the present invention.
Figure 2:
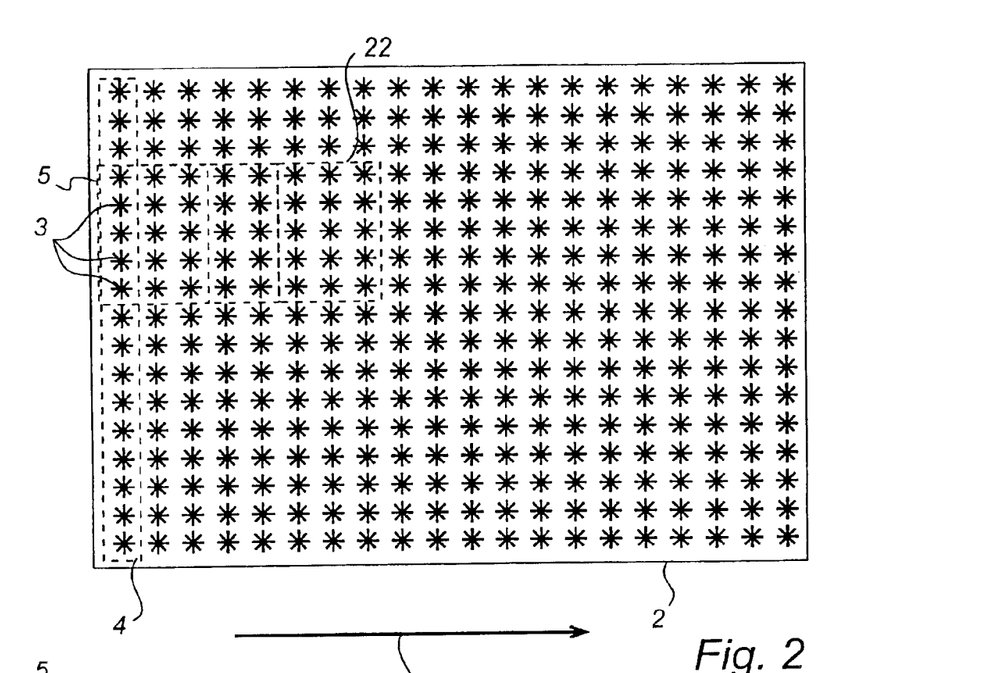
FIG. 2 illustrates in more detail the coding pattern in FIG. 1.

FIG. 1 shows a document 1 with a coding pattern 2 comprising a matrix according to a preferred embodiment of the present invention. FIG. 2 shows in more detail coding pattern 2 comprising a plurality of symbols 3 arranged in sequence portions 4 in columns in the matrix, each symbol 3 defining the value "0", "1", "2", or "3". Each column of symbols may be a sequence portion of a sequence with 1024 symbols. Those skilled in the art will appreciate that a number of symbols other than 1024 may be used. An arbitrary subsequence, consisting of five symbols may define unambiguously the position of the subsequence in the sequence. The sequences in the different columns are displaced in relation to each other. FIG. 2 also shows a marking 31 which indicates in which direction the matrix is to be recorded for the string of characters to be recorded. In FIG. 2, all symbols are identical, however, the symbols will be different depending upon which value represented by the symbol.

Figure 3:
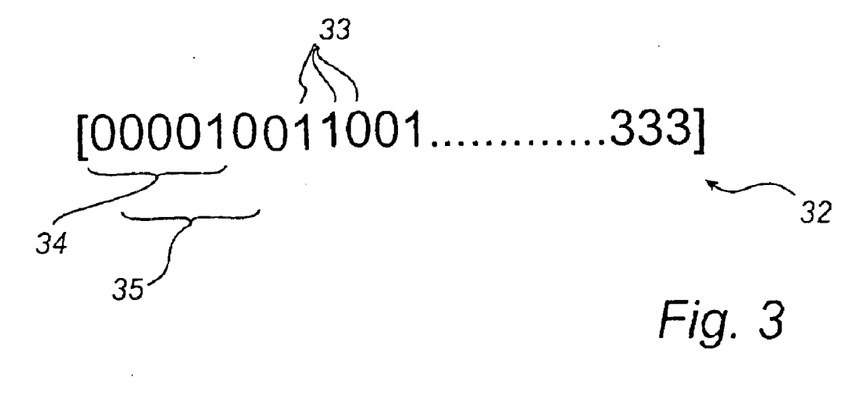
FIG. 3 illustrates a sequence which can be used to code data according to the present invention.
Figure 4:
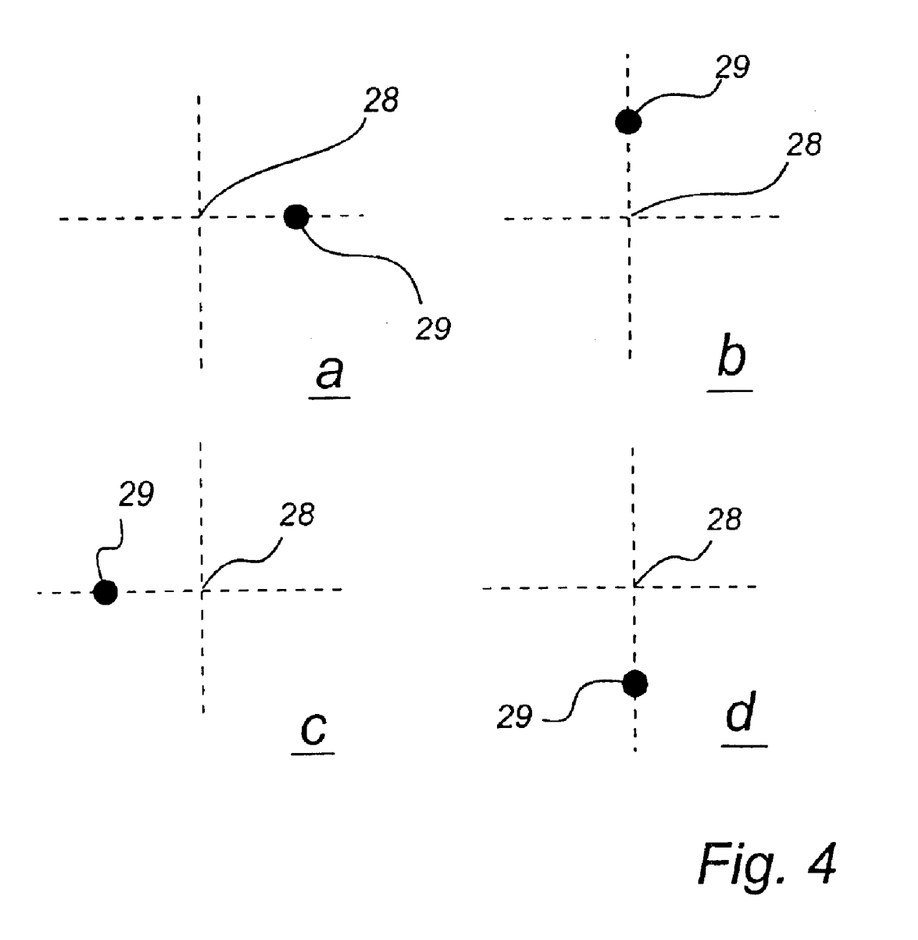
FIG. 4 shows an embodiment of symbols which can be used in the coding pattern in FIGS. 1 and 2.

FIG. 3 illustrates the appearance of a sequence 32 comprising 512 values 33, each of which is either "0", "1", "2", or "3". Arbitrary first and second subsequence 34, 35 with 5 values defines unambiguously a sequence value which corresponds to the position of the subsequence in the sequence 32. Each subsequence appears only once in the sequence. Thus, the first subsequence 34 corresponds to the value "0" and the second subsequence 35 to the value "1". In FIG. 2, the columns consist of sequence portions 4 of such sequences in which the values have been converted into symbols 3. Sequences of this kind are described in "Pseudo-Random Sequences and Arrays" by F. Jessie MacWilliams and Neil J. A. Sloane in "Proceedings of the IEEE Vol. 64, No. 12, December 1976" the technical disclosure of which is hereby incorporated herein by reference.

FIG. 4a through FIG. 4d show an embodiment of a symbol which can be used in the matrix in FIG. 1 according to the present embodiment. The symbol may include a virtual raster point 28 which is represented by the intersection between the raster lines 24 and 25, and a marking 29. The value of the symbol may depend on where the marking is located. As shown in FIGS. 4a through FIG. 4d, there are four possible locations for marking 29 on the raster lines extending from the raster points. For example, the symbol has in FIG. 4a the value "0", in FIG. 4b the value "1", in FIG. 4c the value "2" and in FIG. 4d the value "3". In other words, there may be four different types of symbols representing four values "0–3" respectively. The displacement from the raster points 28 to marking 29 may be the same for all values.

Figures 5A, 5B:
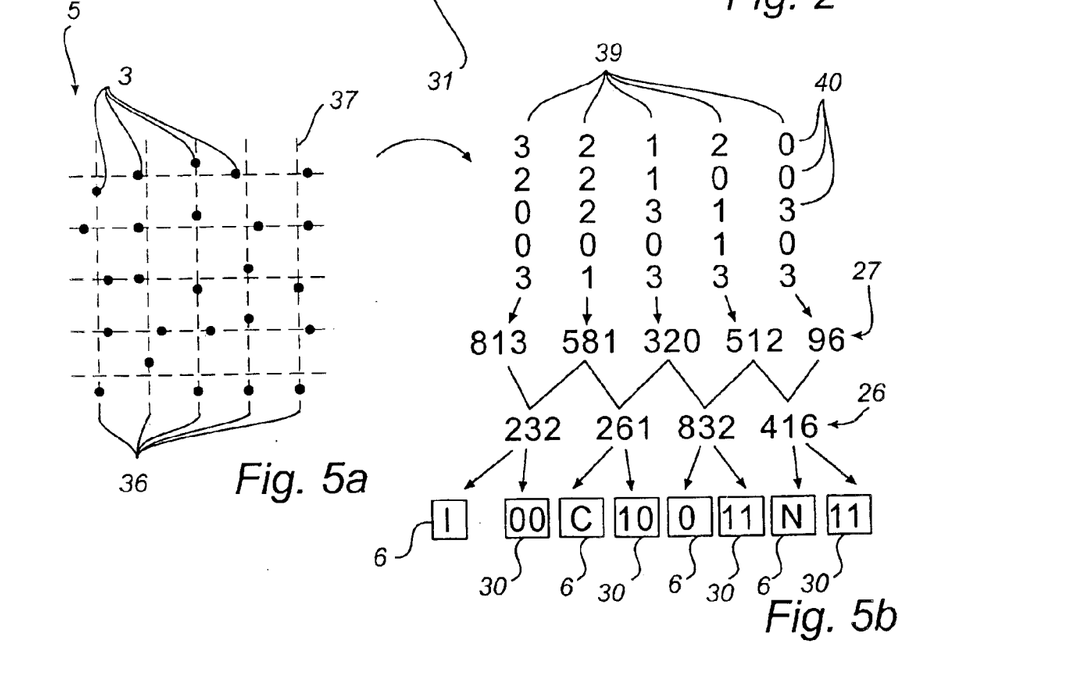
FIG. 5a shows a sub-matrix of a coding pattern according to the present invention.
FIG. 5b shows the matrix when the symbols have been converted into values.

FIG. 5a shows in greater detail a sub-matrix 5 of the coding pattern 2 comprising the matrix from FIG. 1. The sub-matrix 5 contains five subsequences 36 arranged in columns in sub-matrix 5. FIG. 5a also shows the virtual raster 37 in relation to which the symbols are arranged. FIG. 5b shows the matrix when the symbols 3 have been converted into values respectively.

Figure 6:
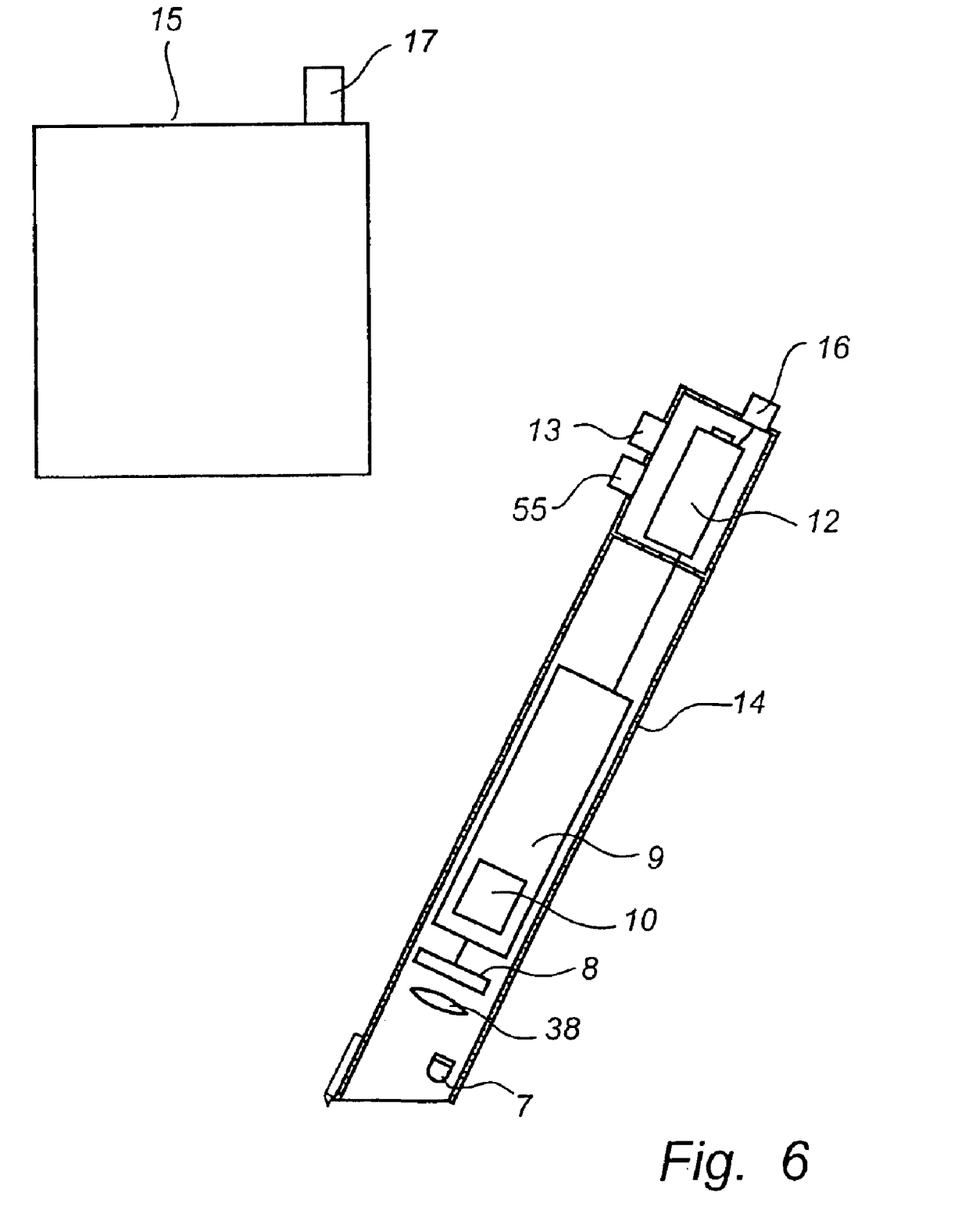
FIG. 6 shows an apparatus according to a preferred embodiment of the invention.

FIG. 6 shows an apparatus according to a preferred embodiment of the present invention. The apparatus may include a reading pen 14 which is arranged for recording coding pattern 2 as shown in FIG. 2. The reading pen 14 is intended to be held by a user's hand to record images from a base. Those skilled in the art will appreciate, however, that there are many ways other than a user's hand, to utilize the apparatus. The reading pen 14 may include a light-emitting diode 7 for illuminating a surface which is to be recorded, an image sensor 8 in the form of a CCD for recording of images, a processor 9, and a memory 10. In front of the CCD, a lens system 38 may be arranged for imaging the coding pattern on the CCD. The reading pen 14 may further include a battery 12 for power supply and button 13 for switching reading pen 14 on and off. Reading pen 14 may be provided with a transmitter 16 for transmitting recorded information to a computer 15, which in turn may be provided with a receiver 17 for receiving information from the reading pen 14. Transmitter 16 and the receiver 17 may communicate, for example, by wireless or wireline means. In the present invention, wireless is defined as radio transmission via the airwaves. Those skilled in the art, however, will appreciate that various other communication techniques can be used to provide wireless transmission including infrared line of sight, cellular, microwave, satellite, packet radio and spread spectrum radio. The information recorded by reading pen 14 can be transmitted to the computer for further processing. The reading pen 14 can be provided with a display (not shown) for presentation of the information recorded by the reading pen 14. The reading pen 14 can also be provided with a loudspeaker 55 to transmit sounds corresponding to the data.

With reference to FIGS. 2, 5a, 5b, and 6, the recording of a coding pattern will now be described. When reading pen 14 is passed across coding pattern 2 with symbols 3, an area may be recorded. This area may at least include a first area comprising sub-matrix 5 comprising a five by five matrix of symbols 3. The symbols may be one of the four different types shown in FIG. 4. The processor 9 may convert the recorded image from the symbol subsequences 36 in the matrix into value subsequences 39 with values 40. Each values subsequence 39 may correspond to a sequence value 27 which may correspond to the position in a sequence with 1024 values, each of which may be either "0", "1", "2" or "3". If an image is recorded which is displaced one row in the matrix, sequence values may be obtained, corresponding to the next position in the sequence. The apparatus may convert the subsequences 39 into sequence values 27. Then the apparatus may calculate data values 26 as the difference modulo 1024 between the sequence values 27 for adjoining columns. By the sequence values 27 increasing to the same extent for each column if the recorded image is displaced in the direction of the column, the data values 26, which equal the difference between the sequence values 27, may be independent of the height at which the image is recorded. The data values 26 may then be converted into binary form and the eight least significant bits in each data value 26 may be converted into characters 6 which are stored in memory 10, while the two most significant bits from four adjoining data values 26 may be converted into a position sequence part. Thus it may be possible to code a total of 256 different characters. The position sequence part may constitute part of a position sequence similar to the sequence in FIG. 3, to define unambiguously a position in the position sequence and to constitute a position value for the columns.

In FIG. 5, the characters 6 may be characters in a text. However, it may be preferable for the characters 6 to be characters in a compressed text so that the string of characters which consists of the characters 6 may be converted so as to obtain text en clair.

The position values for the columns may be used to determine whether a character from a subsequently recorded image has already been stored in the string of characters in the memory. This may be usable since the next image which is recorded may comprise, for example, a second area 22 which comprises parts of the first area comprising sub-matrix 5. When the subsequences in the second area 22 are converted into characters, the characters may be partly the same as those recorded when the first area comprising sub-matrix 5 was recorded. By the position value being given by the difference values, the previously stored characters can be dropped. A coding pattern codes, for example, the series [(0, 12), (1, 25), (2, 37), (3, 82), (4, 24), (5, 16)] in which the first value in each pair of values corresponds to a position value and the second value corresponds to a data value. In a first image, the series [(0, 12), (1, 25), (2, 37), (3, 82)] may be recorded. In a second image, the series [(2, 37), (3, 82) (4, 24), (5, 16)] may be recorded. Thus, the values "37" and "82" may be recorded twice. The position values may indicate, however, that they have been recorded even the first time, which makes it possible to produce the correct series once more.

Figure 8:
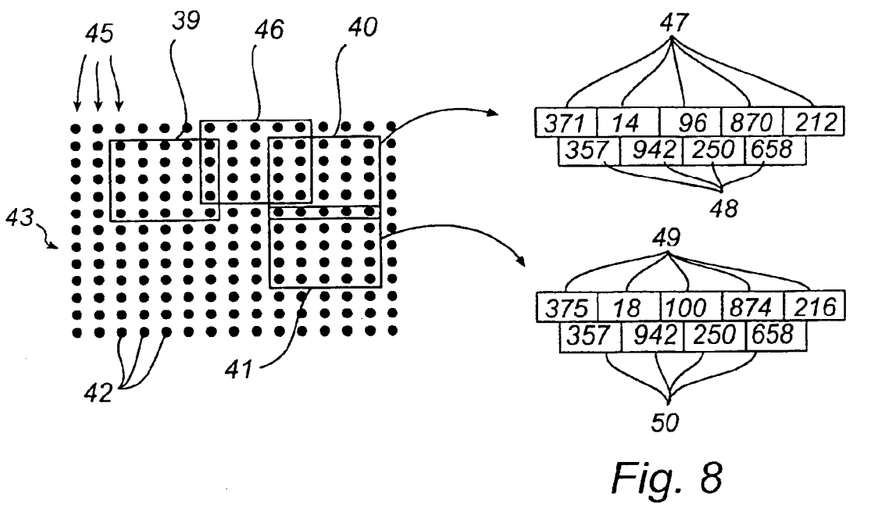
FIG. 8 shows the conversion of the coding pattern into sequence values in accordance with the invention.

A further example of when the positions of the subsequences are important may be when reading pen 14 is quickly passed across coding pattern 2. In this case, there is a risk that some information is not recorded. By having a position code in the subsequences, it will be possible to pass reading pen 14 across coding pattern 2 once more, thereby recording the information that was not recorded the first time. This is illustrated in FIG. 8. FIG. 8 shows a small part 43 of coding pattern 2 in the form of a plurality of symbols 42 arranged in columns 45 in a matrix. It may be thus sufficient to record a subsequence consisting of five symbols of each column 45. When reading pen 14 is passed across the coding pattern, several images may be recorded. A first image 39 and a second image 40, recorded by reading pen 14, may be separated. Since some of the symbols 42 in the pattern have not been recorded in an image, some information is missing. It may then be possible to pass reading pen 14 across the coding pattern a second time to record a third image 46 which contains information from the columns that were missing in the first image 39 and in the second image 40. By the subsequences containing position information, it may be possible to enter the information from the third image 46 in the correct position in relation to the information from the first image 39 and second image 40. A coding pattern codes, for example, the series [(0,12), (1,25), (2,37), (3,82), (4,24), (5,16), (6,32), (7,79), (8,31), (9,52), (10,59), (11,42)] where the first value in each pair of values indicates the position value and the second value indicated the data value. In the first recording 39, the series [(0,12),(1,25),(2,37),(3,82),(4,24)] may be recorded. In a second recording 40 the series [(7,79),(8,31),(9,52),(10,59),(11,42)] may be recorded. In a third recording 46, the series [(3,82),(4,24),(5,16),(6,32),(7,79)] may be recorded whereby positions (5,16) och (6,32) may be obtained from the third recording and the complete series can be produced once more.

Figure 7:
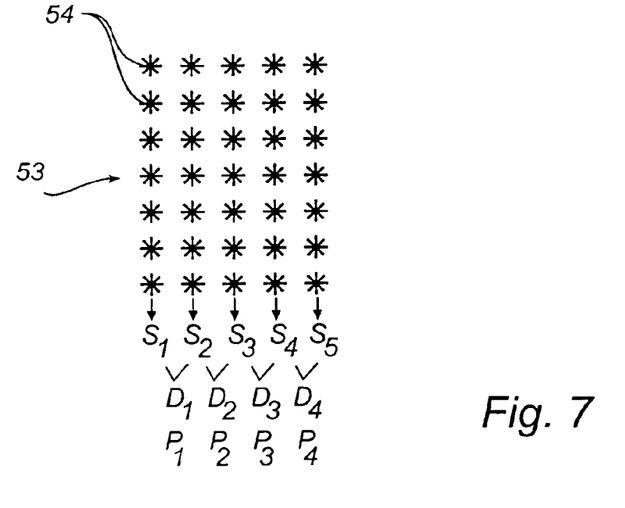
FIG. 7 shows the conversion of a matrix into data values and a position value in accordance with the invention.

According to a preferred embodiment, each difference value may code only part of a position value. This is illustrated in FIG. 7. The matrix 53 with symbols 54 may be converted into sequence values $S_1$–$S_5$ in the same manner as described above. The difference between the sequence values forms a set of data values $D_1$–$D_4$ and a set of sub-position values $P_1$–$P_4$ which together form a sequence defining a position value which indicates the position of the matrix in the coding pattern.

FIG. 8 also illustrates how the information from images, which have been recorded at different heights in the matrix, may be processed. The first image 40 contains a five by five matrix of symbols. The symbols may be converted into values as described in connection with FIG. 5b. The values in the columns may then be converted into sequence values which correspond to the position of the subsequence in the sequence. The five subsequences with symbols which correspond to the columns in the first image 40 may thus be converted into a first set of five sequence values 47. The first set of five sequence values 47 is then converted into a first set of difference values 48, which in turn may be converted into characters in the same way as described in connection with FIG. 5b. When a third image 41 containing a five by five matrix of symbols is recorded, the five subsequences consisting of five symbols may be converted into a second set of five sequence values 49. The second set of five sequence values 49 may then be converted into a second set of difference values 50 which in turn may be converted into characters in the same way as described in connection with FIG. 5b. Each of the sequence values 49 in the second set is four units greater than the sequence values 47 in the first set since they are fetched further down in the sequences of which the sequence parts consist a part. However, each of the difference values 48 in the first set of difference values may be equal to the corresponding difference value in the second set of difference values. Thus, the difference values may be independent of the height at which in small part 43 of coding pattern 2 the images have been recorded.

When producing the matrix in FIG. 5b, each character 6 in a string of characters may first be converted into data values by means of a reference table which is stored in memory 10. The data values may consist of eight bits. Difference values 26 may then be produced by adding position information in the form of two binary bits to the data values. The position information 30 may be selected in such manner that four successive difference values 26, 48, and 50 give a position subsequence which unambiguously defines a position value which gives a position subsequence which unambiguously determines a position in a position sequence. Parts of identical sequences may then be arranged in columns in the matrix. The identical sequences may be such that a subsequence with five successive values from the sequence unambiguously determines a sequence value 27 which corresponds to the position of the subsequence in the sequence. The parts of the sequences may be arranged in such manner that the set of differences between the sequence values for the sequence parts, which have been taken from the same rows in the matrix, corresponds to the difference values 27. Subsequently the values 40 in the sequences may be converted into symbols 3.

Figure 9:
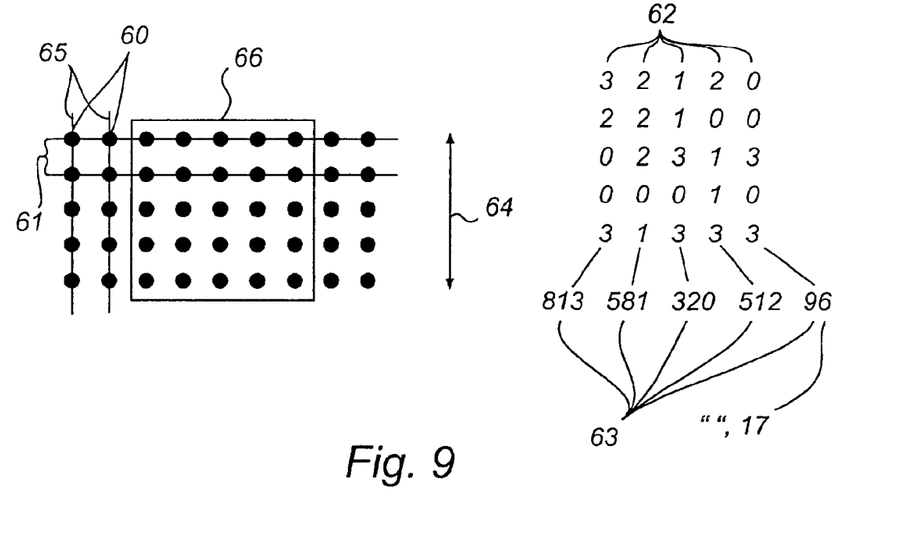
FIG. 9 shows how part of an alternative embodiment of a coding pattern is converted into data values in accordance with the invention.

FIG. 9, another embodiment of a coding pattern is shown in which the entire coding pattern has a height 64 corresponding to the length of a subsequence, i.e., five symbols 60 in this case. The coding pattern may be of a similar type as described in connection with FIGS. 5a and 5b, i.e., the value of a symbol depends on the position of a marking 60 in relation to a virtual raster with raster lines 65. The distance 61 between different raster lines 65 is 0.3 mm in this embodiment. With this distance between the raster points, the coding pattern may become considerably robust while at the same time being compact. The symbols in the square 66 may be converted into subsequences 62 as described in connection with FIG. 5. The subsequences may in turn be converted into sequence values 63. According to this embodiment each sequence value may correspond to a character and a position code. The sequence value "96" may correspond, for example, to the character " " (space) and the position code "17". According to this embodiment of the invention the reading pen 14 may thus have to record all symbols in the height of the coding pattern in order to be able to convert into text. An advantage of this embodiment is that each character may be recorded by recording only one column of symbols.

In a preferred embodiment, 6 by 6 symbols may be used for coding the pattern. A more detailed explanation of how the coding is done appears from Applicant's PCT patent applications Nos. WO 00/73983, PCT/SE00/01895 and WO 01/16691, the technical disclosures of which are incorporated herein by reference.

The above embodiments are to be considered examples only.

A person skilled in the art realizes that the above embodiments can be varied in a number of ways without departing from the inventive idea. For example, it is not necessary that the apparatus be a single integrated unit.

It is not necessary for the invention that a display be arranged directly on the user unit.

Although the examples above only illustrate that the sequence portions are arranged in columns in a matrix, this is not necessary for the invention. The sequence portions can be arranged in an arbitrary manner.

The sequences that are used to code the data need not be 1024 symbols long.

In view of the foregoing, it will be appreciated that the present invention provides methods, systems, and data structures for storage of non-sequential data and an apparatus adapted to read non-sequential data stored by the method. Still, it should be understood that the foregoing relates only to the exemplary embodiments of the present invention, and that numerous changes may be made thereto without departing from the spirit and scope of the invention as defined by the following claims.

Concurrently filed with the application for this patent are applications entitled Systems and Methods for Information Storage based on Swedish Application No. 0000947-2, filed Mar. 21, 2000, and U.S. Provisional Application No. 60/207,839, filed May 30, 2000; Secured Access Using a Coordinate System based on Swedish Application No. 0000942-3, filed Mar. 21, 2000, and U.S. Provisional Application No. 60/207,850 filed on May 30, 2000; System and Method for Printing by Using a Position Coding Pattern based on Swedish Application No. 0001245-0, filed on Apr. 5, 2000, and U.S. Provisional Application No. 60/210,651, filed on Jun. 9, 2000; Apparatus and Methods Relating to Image Coding based on Swedish Application No. 0000950-6, filed on Mar. 21, 2000, and U.S. Provisional Application No. 60/207,838, filed on May 30, 2000; Apparatus and Methods for Determining Spatial Orientation based on Swedish Application No. 0000951-4, filed on Mar. 21, 2000, and U.S. Provisional Application No. 60/207,844, filed on May 30, 2000; System and Method for Determining Positional Information based on Swedish Application No. 0000949-8, filed Mar. 21, 2000, and U.S. Provisional Application No. 60/207,885, filed on May 30, 2000; Method and System for Transferring and Displaying Graphical Objects based on Swedish Application No. 0000941-5, filed Mar. 21, 2000, and U.S. Provisional Application No. 60/208,165, filed May 31, 2000; Online Graphical Message Service based on Swedish Application No. 0000944-9, filed Mar. 21, 2000, and U.S. Provisional Application No. 60/207,881, filed May 30, 2000; Method and System for Digitizing Freehand Graphics With User-Selected Properties based on Swedish Application No. 0000945-6, filed Mar. 21, 2000, U.S. Provisional Application No. 60/207,882, filed May 30, 2000; Data Form Having a Position-Coding Pattern Detectable by an Optical Sensor based on Swedish Application No. 0001236-9, filed Apr. 5, 2000, and U.S. Provisional Application No. 60/208,167, filed May 31, 2000; Method and Apparatus for Managing Valuable Documents based on Swedish Application No. 0001252-6, filed Apr. 5, 2000, and U.S. Provisional Application No. 60/210,653 filed Jun. 9, 2000; Method and Apparatus for Information Management based on Swedish Application No. 0001253-4 filed Apr. 5, 2000, and U.S. Provisional Application No. 60/210,652, filed Jun. 9, 2000; Device and Method for Communication based on Swedish Application No. 0000940-7, filed Mar. 21, 2000, and U.S. Provisional Application No. 60/208,166, filed May 31, 2000; Information-Related Devices and Methods based on Swedish Application No. 0001235-1, filed Apr. 5, 2000, and U.S. Provisional Application No. 60/210,647, filed Jun. 9, 2000; Processing of Documents based on Swedish Application No. 0000954-8, filed Mar. 21, 2000, and U.S. Provisional Application No. 60/207,849, filed May 30, 2000; Secure Signature Checking System based on Swedish Application No. 0000943-1, filed Mar. 21, 2000, and U.S. Provisional Application No. 60/207,880, filed May 30, 2000; Identification of Virtual Raster Pattern, based on Swedish Application No. 0001235-1, filed Apr. 5, 2000, and U.S. Provisional Application No. 60/210,647, filed Jun. 9, 2000, and Swedish Application No. 0004132-7, filed Nov. 10, 2000, and U.S. Provisional Application No. 60/261,122, filed Jan. 12, 2001; and a new U.S. Provisional Application entitled Communications Services Methods and Systems.

The technical disclosures of each of the above-listed U.S. applications, U.S. provisional applications, and Swedish applications are hereby incorporated herein by reference. As used herein, the incorporation of a "technical disclosure" excludes incorporation of information characterizing the related art, or characterizing advantages or objects of this invention over the related art.

In the foregoing Description of Preferred Embodiments, various features of the invention are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Preferred Embodiments, with each claim standing on its own as a separate preferred embodiment of the invention.

What is claimed is:

1. A method for storage of non-sequential data, comprising:

coding the non-sequential data to a coding pattern, the coding pattern comprising subsequences of at least one sequence with symbols which has the characteristic that an arbitrary subsequence of a predetermined magnitude of the sequence is unique within the sequence and unambiguously defines a position of the subsequence in the sequence; and reproducing the coding pattern on a product.

2. The method of claim 1 further comprising:

converting the non-sequential data into a set of data values, arranging the coding pattern so as to comprise sequence portions of said at least one sequence, said sequence portions being at least of the same magnitude as the subsequences of a predetermined magnitude, so that each of the data values is coded by a group each of at least two sequence portions in the coding pattern.

3. The method of claim 1 further comprising:
converting the non-sequential data into a set of data values, arranging the coding pattern so as to comprise sequence portions of said at least one sequence, said sequence portions being of the same magnitude as the subsequences of a predetermined magnitude, so that each of the data values is coded by one sequence portion in the coding pattern.

4. The method of claim 2, wherein the non-sequential data is coded with only one sequence, wherein the position of a subsequence in the sequences constitutes a sequence value, and wherein a relationship between the sequence values from different sequence portions defines the data values.

5. The method of claim 4, wherein each of the data values is defined by a difference between the sequence values for two subsequences from different sequence portions.

6. The method of claim 5, wherein the sequence portions are juxtaposed in the coding pattern to form a matrix in such manner that each of the data values is defined by a difference between the sequence values of two adjoining subsequences from corresponding parts of the sequence portions in the coding pattern.

7. The method of claim 6, wherein the sequence portions also code at least part of a position value which defines a serial number of the sequence portion.

8. The method of claim 1, wherein the non-sequential data comprises characters and wherein the characters are converted into data values.

9. The method of claim 1, wherein the non-sequential product comprises at least one of the following: a sheet of paper, a book cover, a page of a book, a magazine cover, a magazine page, a newspaper page, and a bulletin board.

10. The method of claim 1, further comprising coding position indications in the coding pattern.

11. The method of claim 1, further comprising coding a position sequence in said coding pattern, which position sequence indicates positions in the coding pattern, and which has the characteristic that an arbitrary subsequence of a predetermined magnitude of the position sequence uniquely and unambiguously defines a position of the subsequence in the position sequence.

12. The method of claim 11, wherein the position sequence indicates absolute positions of the subsequences in the intended reading direction of the coding pattern.

13. A system for the storage of non-sequential data, comprising:
a component for coding the non-sequential data to a coding pattern, the coding pattern comprising subsequences of at least one sequence with symbols which has the characteristic that an arbitrary subsequence of a predetermined magnitude of the sequence is unique within the sequence and un-ambiguously defines the position of the subsequence in the sequence; and
a component for reproducing the coding pattern on a product.

14. The system of claim 13 further comprising:
a component for converting the non-sequential data into a set of data values, and a component for arranging the coding pattern so as to comprise sequence portions of said at least one sequence, said sequence portions being at least of the same magnitude as the subsequences of a predetermined magnitude, so that each of the data values is coded by a group each of at least two sequence portions in the coding pattern.

15. The system of claim 14, wherein the non-sequential data is coded with only one sequence, wherein a position of a subsequence in the sequences constitutes a sequence value, and wherein a relationship between the sequence values from different sequence portions defines the data values.

16. The system of claim 15, wherein each of the data values is defined by a difference between the sequence values for two subsequences from different sequence portions.

17. The system of claim 16, wherein the sequence portions are juxtaposed in the coding pattern to form a matrix in such manner that each of the data values is defined by a difference between the sequence values of two adjoining subsequences from corresponding parts of the sequence portions in the coding pattern.

18. The system of claim 17, wherein the sequence portions also code at least part of a position value which defines a serial number of the sequence portion.

19. The system of claim 13, wherein the non-sequential data comprises characters and wherein the characters are converted into data values.

20. The system of claim 13, wherein the product comprises at least one of the following: a sheet of paper, a book cover, a page of a book, a magazine cover, a magazine page, a newspaper page, and a bulletin board.

21. An apparatus for optically recording information, comprising:
an image sensor adapted to optically record an image from a surface; and
a processor configured to convert the image into non-sequential data, the image comprising a predetermined number of subsequences with symbols, each of the subsequences uniquely and unambiguously corresponding to a position in a predetermined sequence which is arranged in such manner that an arbitrary subsequence of a predetermined magnitude is unique within the sequence and unambiguously defines a position in the sequence.

22. The apparatus of claim 21, further comprising a display adapted to show the data.

23. The apparatus of claim 21, further comprising a loudspeaker adapted to transmit sounds corresponding to the data.

24. The apparatus of claim 21, wherein the processor is further configured to convert the symbols into subsequences with values, to convert the subsequences with values into sequence values, to calculate difference values as the difference between the sequence values, to convert the difference values into data values, and to convert the data values into data.

25. The apparatus of claim 24, wherein at least one of the difference values is used to determine relative positions of the subsequences.

26. The apparatus of claim 25, wherein the relative position of the subsequences is used to decide whether data corresponding to a data value has been previously recorded.

27. A system for processing optical information, the system comprising:
a memory for storing computer-executable instructions; and
a processor functionally coupled to the memory for executing the computer-executable instructions operable for:
recording an input signal corresponding to an image, the image comprising a predetermined number of subsequences with symbols, each of the subsequences unambiguously corresponding to a position in a predetermined sequence which is arranged in such manner that an arbitrary subsequence of a predetermined magnitude is unique within the sequence and unambiguously defines a position in the sequence, and converting the predetermined number of subsequences into non-sequential data.

28. The system of claim 27, wherein the computer-executable instructions cause the data to be presented on a display unit.

29. The system of claim 27, further comprising a loudspeaker adapted to transmit sounds corresponding to the data.

30. The system of claim 27, wherein the computer-executable instructions are further operable for decoding position indications for the non-sequential data from the subsequences in the image.

31. A computer-readable memory medium, having computer-executable modules, comprising:

a component for recording an input signal corresponding to an image including a predetermined number of subsequences with symbols; and a component for converting the predetermined number of subsequences into data by determining the unique and unambiguous position of each of the subsequences in a predetermined sequence which is arranged in such manner that an arbitrary subsequence of a predetermined magnitude is unique within the sequence and unambiguously defines a position in the sequence, and by converting the positions of the subsequences in the sequence to non-sequential data.

32. The computer-readable memory medium of claim 31, wherein a program causes a computer to output a signal to a display unit for presentation of the data.

33. The computer-readable memory medium of claim 31, wherein the computer-executable modules further comprises a component for decoding position indications for the non-sequential data from the subsequences in the image.

34. A method for storage of non-sequential data, comprising:

using a coding pattern for storage of text, said coding pattern comprised of sequence portions with symbols which each include at least a subsequence of a sequence which is arranged in such manner that an arbitrary subsequence of a predetermined magnitude of the sequence is unique within the sequence and unambiguously defines the position of the subsequence in the sequence.

35. The method of claim 34, wherein said sequence portions code a position sequence, which position sequence indicates positions along an intended reading direction of the coding pattern, and which position sequence has the characteristic that an arbitrary subsequence of a predetermined magnitude of the position sequence uniquely and unambiguously defines a position of the subsequence in the position sequence.

36. A method for storage of non-sequential data, comprising:

converting the non-sequential data into a set of data values;

coding the non-sequential data coding the data values to a coding pattern by means of at least one sequence with symbols, in which sequence any arbitrary subsequence of a predetermined magnitude of the sequence is unique and unambiguously defines a position of the subsequence in the sequence, the coding pattern being arranged so as to comprise sequence portions of said at least one sequence, said sequence portions being at least of the same magnitude as the subsequences of a predetermined magnitude, wherein the sequence portions also code at least part of a position value which defines a serial number of the sequence portion; and reproducing the coding pattern on a product.

* * * * *